United States Patent [19]
Baxter, Jr.

[11] Patent Number: 5,334,116
[45] Date of Patent: Aug. 2, 1994

[54] ALL WHEEL DRIVE TRANSFER CASE HAVING TWO WHEEL OVERDRIVE

[75] Inventor: Ralph W. Baxter, Jr., Fort Wayne, Ind.

[73] Assignee: Dana Corporation, Toledo, Ohio

[21] Appl. No.: 999,311

[22] Filed: Dec. 31, 1992

[51] Int. Cl.⁵ .............................................. F16H 37/06
[52] U.S. Cl. .................. 475/204; 475/206; 475/149; 475/154; 180/248; 180/249
[58] Field of Search .............. 475/149, 151, 154, 182, 475/204, 206; 180/248, 249, 247

[56] References Cited

U.S. PATENT DOCUMENTS

| | | | |
|---|---|---|---|
| 1,366,678 | 1/1921 | Logan. | |
| 3,505,904 | 4/1970 | Williams, Jr.. | |
| 4,369,671 | 1/1983 | Matsumoto et al. | 180/247 X |
| 4,417,642 | 11/1983 | Suzuki et al. | 180/249 O R |
| 4,538,700 | 9/1985 | Suzuki | 180/248 O R |
| 4,644,822 | 2/1987 | Batchelor | 475/204 O R |
| 4,677,873 | 7/1987 | Eastman et al. | 475/221 X |
| 4,860,612 | 8/1989 | Dick et al.. | |
| 5,045,036 | 9/1991 | Reuter et al. | 475/149 O R |
| 5,078,660 | 1/1992 | Williams | 475/221 X |
| 5,271,479 | 12/1993 | Kuwahara et al. | 180/249 O R |

Primary Examiner—Rodney H. Bonck
Assistant Examiner—Daniel Wittels
Attorney, Agent, or Firm—Oldham, Oldham & Wilson Co.

[57] ABSTRACT

A transfer case for a vehicle having a pair of front wheels and a pair of rear wheels and capable of all-wheel or two wheel drive has an input shaft connected to a carrier of a planetary gear differential having a ring gear connected to a first output shaft for driving a first pair of wheels and a sun gear connected to a second output shaft for driving a second pair of wheels. A clutch is provided on the planetary gear differential for selectively locking the first and second output shafts together for concurrent rotation when the planetary gear differential clutch is engaged, thereby providing all-wheel drive. A brake is provided for selectively preventing the second output shaft from rotating so that when the second output shaft brake is applied and the planetary gear differential clutch is disengaged, the first output shaft will rotate at an overdrive gear ratio relative to the rotational speed of the input shaft, thereby providing two-wheel drive at an overdrive gear ratio. Particularly, this overdrive ratio is in the range from about 0.3:1 to about 1.0:1.

7 Claims, 2 Drawing Sheets

ALL WHEEL DRIVE TRANSFER CASE HAVING TWO WHEEL OVERDRIVE

The present invention relates to an improved transfer case to provide an all-wheel drive vehicle with two-wheel drive capability in the overdrive gear ratio range.

BACKGROUND OF THE INVENTION

Vehicles with multiple drive wheels require a transfer case to convert a single torque source into a torque source for one or more rear differentials and one or more front differentials, each of which drives a pair of drive wheels on an axle.

In one method used in the art, a pinion differential assembly directly attached to the input shaft in the transfer case is used to divide power between the front drive shaft and the rear drive shaft. A first pinion gear on the differential is used to drive a first sprocket, which is connected to a second sprocket (and ultimately, the front drive shaft) through the high speed chain drive. A second pinion gear, located on the opposite side of the differential from the first pinion gear, is used to directly drive the rear drive shaft. The first sprocket is engaged to, or disengaged from, the first pinion gear by a first clutch mechanism. The second pinion gear is continually engaged to the rear output shaft, the disengagement of power to the rear drive wheels being accomplished by a standard transmission assembly that disengages the power to the input shaft.

In one method of "full time" four wheel drive known in the prior art, a planetary gear differential has been used to divide drive torque from the vehicle transmission between the front and rear output shafts. In such a system, an electromagnetic clutch is provided to selectively lock the planetary gear differential if a predetermined slippage is detected between the front and rear output shafts. In a normal operating condition, the electromagnetic clutch is not energized, and the sun gear and ring gear can rotate relative to each other, providing drive torque to the front and rear drive shafts. When the electromagnetic clutch is activated, the ring gear is locked relative to the sun gear sleeve, so that a direct drive condition exists between the transfer case input shaft and each of the front and rear output shafts, since the planet gears are unable to rotate about their associated shafts, thereby preventing rotation of the planet carrier, which is locked to the transfer case input shaft.

SUMMARY OF THE INVENTION

Based upon the foregoing, there has been found a need to provide a multi-wheel drive vehicle with a transfer case wherein the input power may be divided between the several axle differentials while in all-wheel drive, but that can also provide an overdrive capability when the driver selects two-wheel drive. It is therefore a main object of the invention to provide such a transfer case.

In a preferred form, the transfer case for a vehicle having a pair of front wheels and a pair of rear wheels comprises an input shaft connected to a carrier of a planetary gear differential having a ring gear connected to a first output shaft for driving a first pair of wheels and a sun gear connected to a second output shaft for driving a second pair of wheels. A clutch is provided on the planetary gear differential for selectively locking the first and second output shafts together for concurrent rotation when planetary gear differential cluch is engaged, thereby providing all-wheel drive. A brake is provided for selectively preventing the second output shaft from rotating so that when the second output shaft brake is applied and the planetary gear differential clutch is disengaged, the first output shaft will rotate at an overdrive gear ratio relative to the rotational speed of the input shaft, thereby providing two-wheel drive at an overdrive gear ratio.

BRIEF DESCRIPTION OF THE DRAWINGS

The above and further objects and advantages of the invention will become apparent upon the further reading of the detailed description of the preferred embodiment of the invention, taken in conjunction with the drawings, wherein.

DETAILED DESCRIPTION OF THE INVENTION

Figure 1:
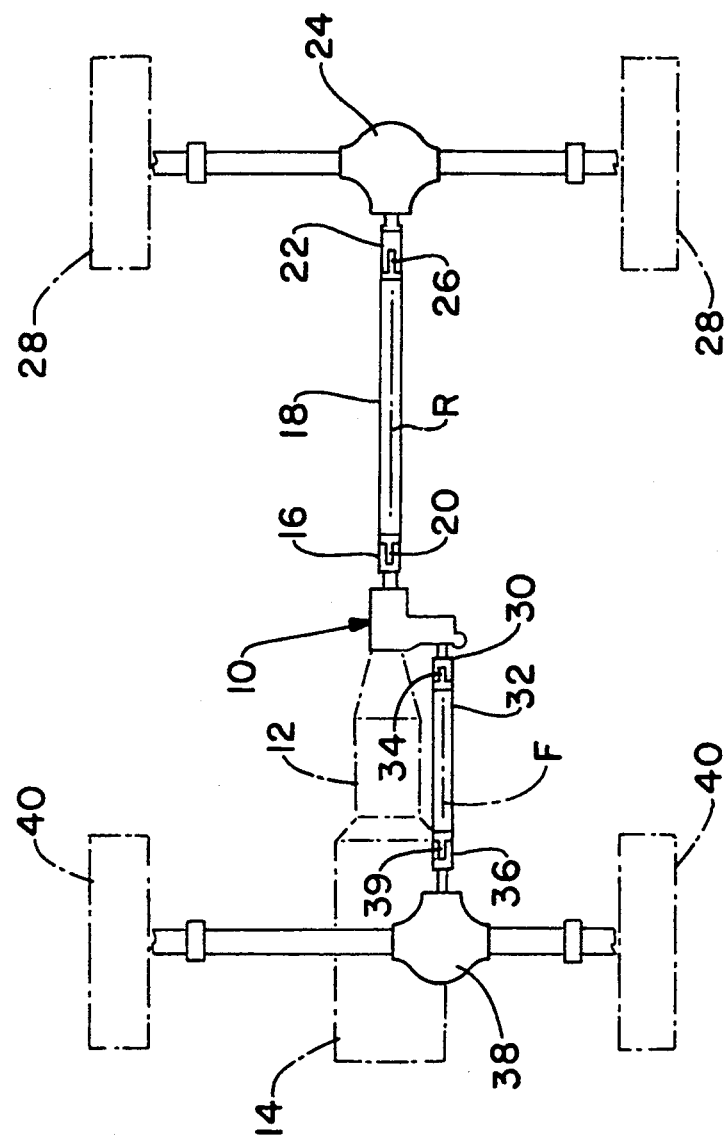
FIG. 1 is a schematic top plan view of a power train of a multi-wheel drive vehicle which utilizes a transfer case such as taught in the present invention.

Referring first to FIG. 1, the four-wheel drive system of the present invention is shown. A transfer case 10 is secured to the rear of a transmission unit 12 (shown in phantom) which in turn is coupled to a drive engine 14 (also shown in phantom). The transmission 12 is provided with an output shaft which is coupled to an input shaft (referred to below in FIG. 2 as 42) of the transfer case 10. The transfer case 10 includes a rear output shaft or yoke 16 connected to the forward end of a rear drive shaft 18 by means of a conventional universal joint coupling 20. The rearward end of the rear drive shaft 18 is coupled to an input shaft or yoke 22 or a rear differential 24 by means of a universal joint coupling 26. The rear differential 24 is adapted to provide torque from the rear drive shaft 18 between the rear wheels 28 (shown in phantom).

The transfer case 10 also is provided with a front output shaft or yoke 30 which is connected to the rearward end of a front drive shaft 32 by means of a universal joint coupling 34. The front drive shaft 32 has a forward end connected to an input shaft or yoke 36 of a front differential unit 38 by means of a universal joint coupling 39 and is adapted to divide torque received from the drive shaft 32 between the vehicle front wheels 40 (shown in phantom). When configured as described, the rear drive shaft 18 is adapted to rotate about an axis R, while the front drive shaft 32 is adapted to rotate about an axis F.

Inside the transfer case 10, the drive torque originating from the transmission 12 is divided between the rear and front output shafts, 16 and 30, respectively. In one case, referred to as "all-wheel drive," drive torque is provided to both shafts. In another case, referred to as "two-wheel drive," drive torque is provided only to one drive shaft. Usually, this is the rear output shaft 16. As will be readily recognized, each of the shafts used in the transfer case will be rotatably supported within the transfer case housing by appropriate support means, such as ball bearing assemblies or the like and the openings through which the shafts enter or exit the housing will be provided with appropriate seal assemblies, as are well known in the prior art. Likewise, all connections between shafts and component parts will be achieved through known means, such as spline connections.

Figure 2:
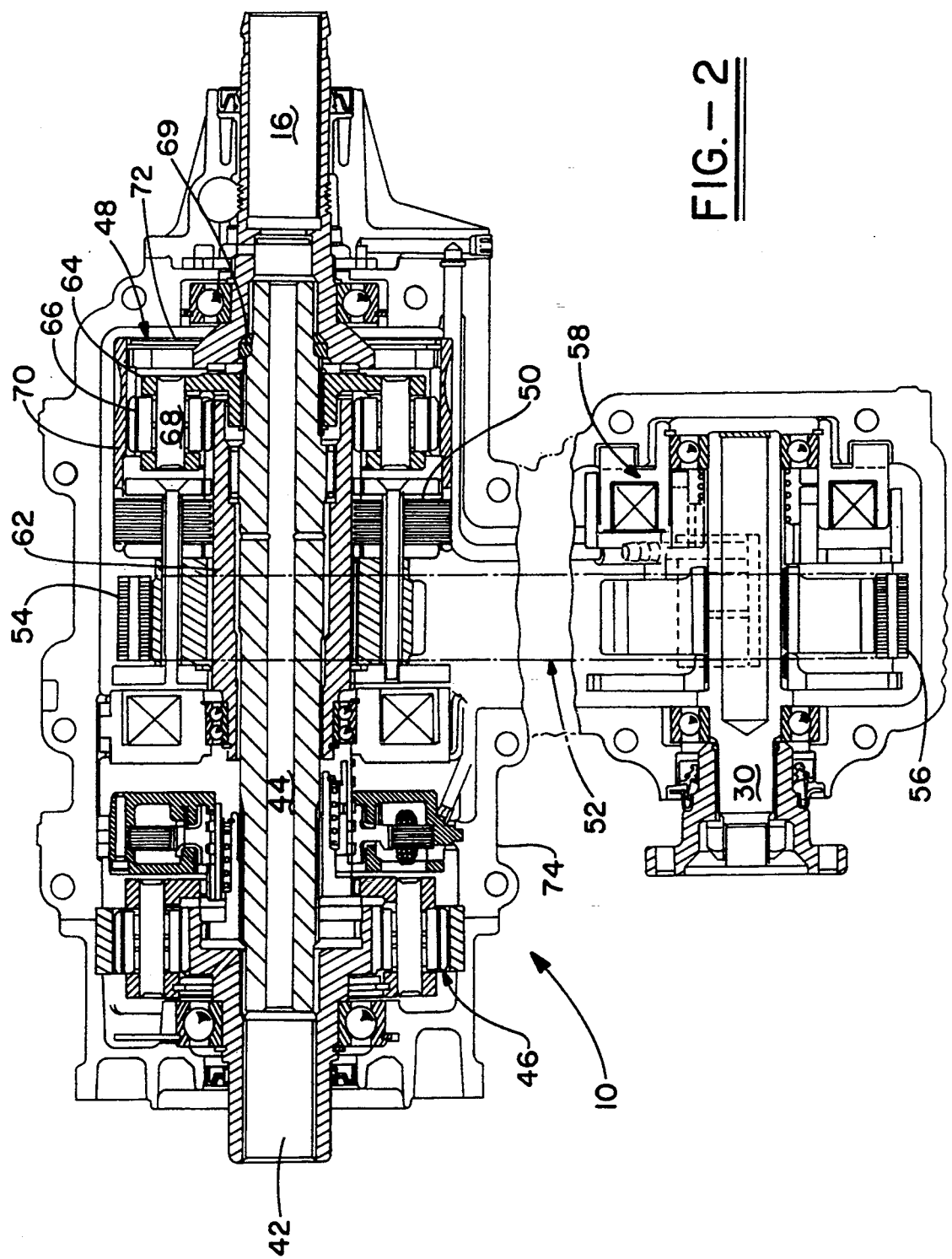
FIG. 2 is a sectional elevational view of the all-wheel drive transfer case of the present invention.

Reference is now made to FIG. 2, which shows the transfer case 10 of the present invention in sectional elevational view. Considering FIG. 2 first in an overall manner, drive torque enters the transfer case 10 through an input shaft 42. Torque from the input shaft 42 is transferred to an internal shaft 44 by a conventional two-speed gear assembly 46. The internal shaft 44 carries the torque to a planetary gear differential 48, the details of which are discussed more fully below. The planetary gear differential 48 divides the torque between the front output shaft 30 and the rear output shaft 16, which concurrently rotate, providing all-wheel drive. Transfer of torque from the planetary gear differential 48 to the front output shaft 30 occurs through a chain drive assembly 52 having a first sprocket 54 and a second sprocket 56.

When the planetary gear differential clutch 50 is disengaged and an electromechanical brake 58 on the front output shaft 30 is activated, preventing rotation of the front output shaft, the vehicle is under two-wheel drive, provided through the rear output shaft 16. This two-wheel drive is provided at an overdrive gear ratio, as explained in more detail below.

A better understanding of the planetary gear differential 48 of the present invention is now obtained by directing attention to the upper right portion of FIG. 2. This sun gear 62 is connected to the first sprocket 54, to cause rotation of sprocket 54 in association therewith. Through sprocket 54 and its connection to the second sprocket 56 through the chain drive assembly 52, the sun gear 62 is connected to the front output shaft 30. The transfer case internal shaft 44 is directly connected to a carrier assembly 64 of the planetary gear differential 44. The carrier assembly 64 carries a plurality of circumferentially spaced apart planet gears 66, each of which are rotatably mounted about a separate shaft 68. A thrust washer 69 is secured to the rearward end of the transfer case internal shaft 44 to limit the axial movement of the carrier assembly 64. External teeth on each planet gear 66 are meshed with external teeth on the sun gear 62, around which the planet gears rotate and a ring gear 70, within which the planet gears rotate. Internal teeth on the ring gear 70 are matingly engaged with the external teeth on the planet gears 66. The ring gear 70 has an end plate 72 directly connected to the rear drive shaft 16, so that rotation of the ring gear 70 results in rotation of the rear drive shaft.

If the sun gear 62 and the ring gear 70 are free to rotate, the rotation of the carrier assembly 64 effected by rotation of the internal shaft 44 results in concurrent rotation of the ring gear and the sun gear, providing drive torque to the respective rear and front output shafts, 16 and 30, respectively. If the sun gear 62 ceases to be free to rotate because the electromechanical brake 58 has been activated, all of the drive torque is transmitted from the carrier assembly 64 to the ring gear 70 through the planet gears 66, and this power transmission is achieved at an overdrive ratio. Particularly, this overdrive ratio is in the range of about 3:1 to 1.0:1 and is most preferably in the range of from about 0.5:1 to 0.7:1.

The transfer case 10 also includes a housing 74, generally comprising more than one section, the sections being held together by conventional fastening means, such as bolts.

It will be understood that hub locks or the like (not shown) will be necessary for disconnecting the front wheels from the drive train when the vehicle is engaged in the two-wheel overdrive mode.

While in accordance with the patent statutes, the best mode and preferred embodiment of the invention have been described, it is to be understood that the invention is not limited thereto, but rather is to be measured by the scope and spirit of the appended claims.

What is claimed is:

1. A transfer case for a vehicle having a pair of front wheels and a pair of rear wheels, said transfer case comprising:
    an input shaft connected to a carrier of a planetary gear differential having a ring gear connected to a first output shaft and a sun gear connected to a second output shaft;
    a clutch provided on the planetary gear differential for selectively locking the first and second output shafts together for concurrent rotation when said planetary gear differential clutch is engaged; and
    a brake for selectively preventing the second output shaft from rotating so that when said second output shaft brake is applied and the planetary gear differential clutch is disengaged, the first output shaft will rotate at an overdrive ratio relative to the rotational speed of the input shaft.

2. The transfer case of claim 1 wherein the input shaft is connected to the carrier through a two-speed gear section and an internal shaft.

3. The transfer case of claim 2 wherein the sun gear is connected to the second output shaft by a sleeve disposed around said internal shaft, said sleeve having a first sprocket mounted thereon, said first sprocket communicated by a chain to a second sprocket mounted on the second output shaft.

4. The transfer case of claim 1 wherein the first output shaft provides drive power to said pair of rear wheels and the second output shaft is adapted to provide drive power to said pair of front wheels.

5. The transfer case of claim 1 wherein the overdrive ratio is in the range of from about 0.3:1 to 1.0:1.

6. The transfer case of claim 5 wherein the overdrive ratio is in the range of from about 0.5:1 to 0.7:1.

7. The transfer case of claim 1 wherein the second output shaft brake is electromechanically actuated.

* * * * *